A. MILBURN.
LANTERN GLOBE.
APPLICATION FILED AUG. 9, 1919.
1,353,839.
Patented Sept. 28, 1920.
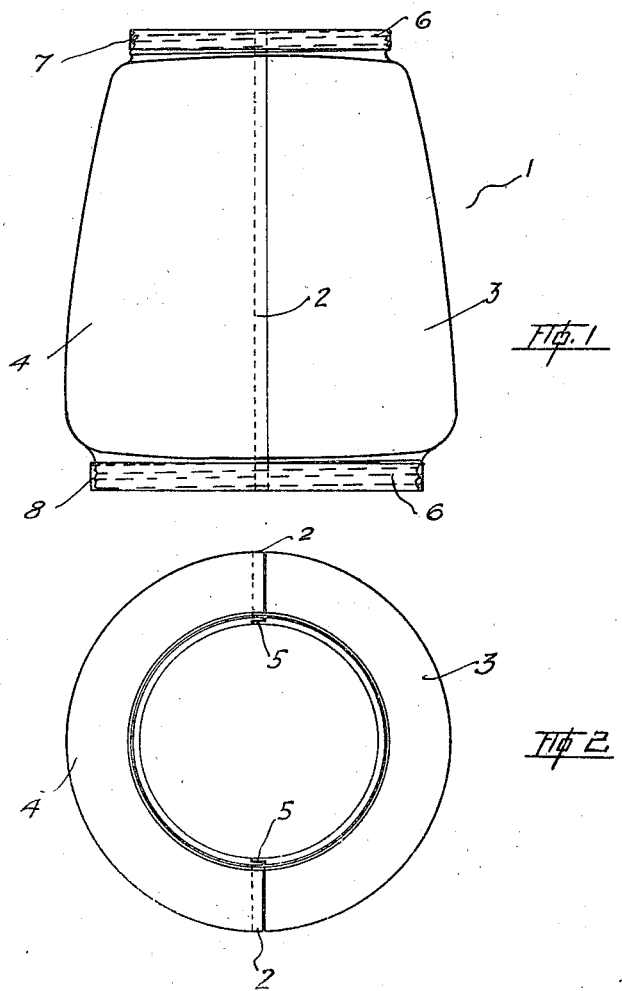
Inventor
Aaron Milburn
BY
Atty.

UNITED STATES PATENT OFFICE.

AARON MILBURN, OF HALL'S PRAIRIE, BRITISH COLUMBIA, CANADA.

LANTERN-GLOBE.

1,353,839.   Specification of Letters Patent.   Patented Sept. 28, 1920.

Application filed August 9, 1919. Serial No. 316,338.

*To all whom it may concern:*

Be it known that I, AARON MILBURN, a subject of the King of Great Britain, and a resident of Hall's Prairie, in the Province of British Columbia, Canada, have invented certain new and useful Improvements in Lantern-Globes, of which the following is a specification.

My invention relates to improvements in lantern globes, and the object of my invention is to devise a globe in which provision is made for undue expansion under heat so that it is not so readily breakable as the globes in use at the present time.

I attain this object by the construction illustrated in the accompanying drawings in which Figure 1 is an elevation of my globe.

Fig. 2 is a plan view.

Similar figures of reference indicate similar parts throughout the views.

The globe is formed of the usual shape but instead of being in one piece it is divided on two sides, as indicated at 2, so that the globe is formed of two half sections 3 and 4, and the divided ends overlap, as shown at 5 in Fig. 2, a slight space being provided, however, at the ends of the laps to allow for their expansion. The upper ends of the globe are threaded, as at 6, so that the sections 3 and 4 may be held securely together by thin metallic rings 7 and 8 threaded on to the respective threads 6, as shown.

The advantage of the construction will be apparent as it will be obvious that the glass is free to expand at the laps 5 under undue heat, the rings 7 and 8 also expanding sufficiently to permit such expansion of the glass, and thus the frequent breakage of such globes due to their inability to expand is prevented.

From the foregoing it will be seen that I have provided a lantern globe which is not readily breakable as those in present use.

What I claim as my invention is—

A lantern globe comprising a pair of separably connected overlapping sections, the upper and lower ends of said globe being threaded, and threaded rings expansible under heat adapted for engagement with the threaded ends of the globe for a purpose specified.

Dated at Fern Ridge this 21 day of July, 1919.

AARON MILBURN.